(12) United States Patent
Vock

(10) Patent No.: US 7,953,648 B2
(45) Date of Patent: May 31, 2011

(54) SYSTEM AND METHODS FOR GENERATING VIRTUAL CLOTHING EXPERIENCES

(76) Inventor: Curtis A. Vock, Boulder, CO (US)

( * ) Notice: Subject to any disclaimer, the term of this patent is extended or adjusted under 35 U.S.C. 154(b) by 1827 days.

(21) Appl. No.: 10/304,335

(22) Filed: Nov. 26, 2002

(65) Prior Publication Data

US 2003/0101105 A1 May 29, 2003

Related U.S. Application Data

(60) Provisional application No. 60/333,675, filed on Nov. 26, 2001.

(51) Int. Cl.
*G06Q 30/00* (2006.01)
(52) U.S. Cl. .................................................. 705/27.2
(58) Field of Classification Search ................ 705/26, 705/27, 27.1, 27.2; 700/132; 345/419, 473; 348/121
See application file for complete search history.

(56) References Cited

U.S. PATENT DOCUMENTS

| | | | | |
|---|---|---|---|---|
| 5,680,528 A * | 10/1997 | Korszun | ........................ | 345/630 |
| 5,850,222 A * | 12/1998 | Cone | ............................ | 345/418 |
| 5,937,081 A * | 8/1999 | O'Brill et al. | ................. | 382/111 |
| 6,307,568 B1 * | 10/2001 | Rom | .............................. | 345/629 |
| 6,546,309 B1 * | 4/2003 | Gazzuolo | ...................... | 700/132 |
| 6,624,843 B2 * | 9/2003 | Lennon | .......................... | 348/61 |
| 6,944,327 B1 * | 9/2005 | Soatto | ............................ | 382/154 |
| 7,149,665 B2 * | 12/2006 | Feld et al. | ......................... | 703/2 |
| 7,308,302 B1 * | 12/2007 | Schuler et al. | ................... | 607/2 |
| 7,308,332 B2 * | 12/2007 | Okada et al. | ................. | 700/130 |
| 7,328,119 B1 * | 2/2008 | Pryor et al. | .................... | 702/127 |
| 7,346,421 B2 * | 3/2008 | Bijvoet | .......................... | 700/132 |
| 7,418,407 B2 * | 8/2008 | Giannini | ......................... | 705/26 |
| 7,433,753 B2 * | 10/2008 | Okada et al. | .................. | 700/130 |
| 2002/0004763 A1 * | 1/2002 | Lam | ................................. | 705/26 |
| 2002/0126132 A1 * | 9/2002 | Karatassos et al. | ........... | 345/586 |
| 2002/0143622 A1 * | 10/2002 | Taliercio et al. | ................ | 705/14 |
| 2002/0178061 A1 * | 11/2002 | Lam | ................................ | 705/14 |
| 2002/0188372 A1 * | 12/2002 | Lane et al. | ...................... | 700/130 |
| 2003/0110099 A1 * | 6/2003 | Trajkovic et al. | ............... | 705/27 |
| 2004/0039592 A1 * | 2/2004 | Shima | ................................ | 705/1 |
| 2004/0078285 A1 * | 4/2004 | Bijvoet | .......................... | 705/26 |
| 2006/0129360 A1 * | 6/2006 | Ballin et al. | ..................... | 703/2 |
| 2006/0202986 A1 * | 9/2006 | Okada et al. | .................. | 345/419 |
| 2007/0143679 A1 * | 6/2007 | Resner | .......................... | 715/706 |
| 2007/0233311 A1 * | 10/2007 | Okada et al. | .................. | 700/138 |
| 2009/0115777 A1 * | 5/2009 | Reyers Moreno | ............ | 345/419 |

OTHER PUBLICATIONS

Human Solutions, Press Release "From virtual try-on to customized manufacture"; May 2003; 2 pages.

* cited by examiner

*Primary Examiner* — Ronald Laneau
(74) *Attorney, Agent, or Firm* — Lathrop & Gage LLP

(57) ABSTRACT

A system for generating a virtual clothing experience has a display for mounting with a wall, one or more digital cameras for capturing first images of the person standing in front of the display, an image processing module for synthesizing the first images and for generating a display image on the display that substantially appears, to the person, like a reflection of the person in a mirror positioned at the display. The cameras capture second images of a garment with the person; the module synthesizes the second images with the first images to generate the image that substantially appears, to the person, that the reflection wears the garment. A home version of the system may be formed with a home computer and a database storing garment images in cooperation with a manufacturer.

29 Claims, 4 Drawing Sheets

SYSTEM AND METHODS FOR GENERATING VIRTUAL CLOTHING EXPERIENCES

RELATED APPLICATIONS

This application claims priority to U.S. Provisional Application No. 60/333,675 Nov. 26, 2001, which is incorporated herein by reference.

BACKGROUND OF THE INVENTION

Buying clothes can be a real chore. A person often travels to a store, and then tries on several articles of clothing in a changing room. The person often has to travel to other stores too in order to find desired purchases.

There is a need to simplify this process and to save time. It is, accordingly, one feature hereinbelow to provide a system that reduces or eliminates the need to physically try on clothing. Another feature hereinbelow is to provide a process to try on articles of clothing on at home, and in private. Other features are apparent within the description that follows.

SUMMARY OF THE INVENTION

In one aspect, a system includes a display that hangs on the wall. The display is for example a plasma or LCD display, or other flat panel display; preferably, the display looks like a mirror that one would use to review and assess worn articles of clothing. An image processing module generates an image on the display based upon (a) a person in front of the display and (b) one or more articles of clothing (e.g., a dress, shoe, shirt, pant). One or more digital cameras capture images of the person; those images are synthesized by the image processing module to generate the image on the display. The cameras may for example integrate with the display as a modular unit.

In one aspect, the system self-identifies, and/or alternatively receives a message identifying, one or more of the articles of clothing to be tried on by the person. A database stores one or more images of the articles, and the image processing module synthesizes the image on the display as a representation of the person wearing the article(s). In this way, a person may select and try an article of clothing by viewing the display and selecting which article to try on. If desired, and the person likes the look of the article, then he may go to a changing room to physically try on the article. The system thus saves repeated trips to the changing room.

In one aspect, the message is generated by an RF signal communicated to the system. In one aspect, the person selects the article of clothing from a list and presses a button indicating which of the articles she would like to try on; pressing the button communicates the message signal to the system. In one aspect, that button is on a hanger or rack associated with the article.

In another aspect, the system views an article of clothing and matches the article to an internal database to automatically generate the image based upon image recognition techniques. For example, a person stands in front of the display and holds an article up next to him; the system interprets this as a signal to search for the article within the database. If the system identifies the article, it synthesizes the article onto the person, in the displayed image, so that the display image appears as if the article is worn on the person.

In one aspect, the invention also provides indication of article size relative to the person. Preferably, the system includes a plurality of digital cameras viewing the person; the positioning of the cameras provides geometric information such that the system determines an approximate size of the person (e.g., for a woman, a size 7, 10, 11 or 12, tall, short, medium, slender, fat; and for a man with a 38 inch waist and 30 inch inseam, or a 44 inch chest and 31 inch arm inseam). The system then determines which article size to show to the person, e.g., a size 7 dress or a "large" dress shirt.

In another aspect, the system receives a message indicating which size the person wishes to try on. Such a message may be communicated for example by pressing of the button described above. In one aspect, if the system determines that the selected article size is inconsistent with the person's actual size (e.g., as determined by the system), the system may display the image with a warning indicator. The indicator may take the form of a red beacon in the display image in a location where the article does not fit the person. The indicator may also simply flash an LED indicating a "sizing problem," suggesting that the person select another size (or let the system suggest or select another size).

In another aspect, a system provides for trying on articles of clothing at home. Preferably, like above, a display is hung in the person's home to show articles selected by the user; the cameras are not necessarily needed. The display may also be the person's home computer. A person selects articles by codes or other means associated with articles of clothing in a database. The database may be linked with a particular manufacturer's clothing, for example Land's End clothing. The database may be linked directly to the display (computer display or an on-wall display) by the Internet. Preferably, a 3D representation of the person is loaded within system memory and that 3D representation is used when selecting and trying on clothes. For example, the code of the article may correspond to a size "7" that is consistent with the 3D representation of the person. Therefore, the system shows the image of the selected article properly overlaid with the person. If however the selected size is not appropriate for the person's 3D representation, then the system may so indicate, such as described above, and within the displayed image. Preferably, the 3D image includes, or couples with, an outer image "skin" of the person so that when the 3D representation and the graphic of the article are synthesized, by the system, then the clothing appears naturally to the person; that is, she sees herself (and with skin and facial features) wearing the article in a way she is used to seeing articles on her body, except for the fact that the image is not a "reflection" but rather a synthesized image of her in the desired article.

In one aspect, the person selects the article for purchase automatically through the system. Preferably, the system integrates seamlessly with one or more manufacturers or sales stores that will process the order.

The system thus provides for virtually trying on various articles of clothing without actually putting them on.

U.S. Pat. No. 5,850,222 provides useful background for the invention and is hereby incorporated by reference.

DETAILED DESCRIPTION OF THE DRAWINGS

Figure 1:
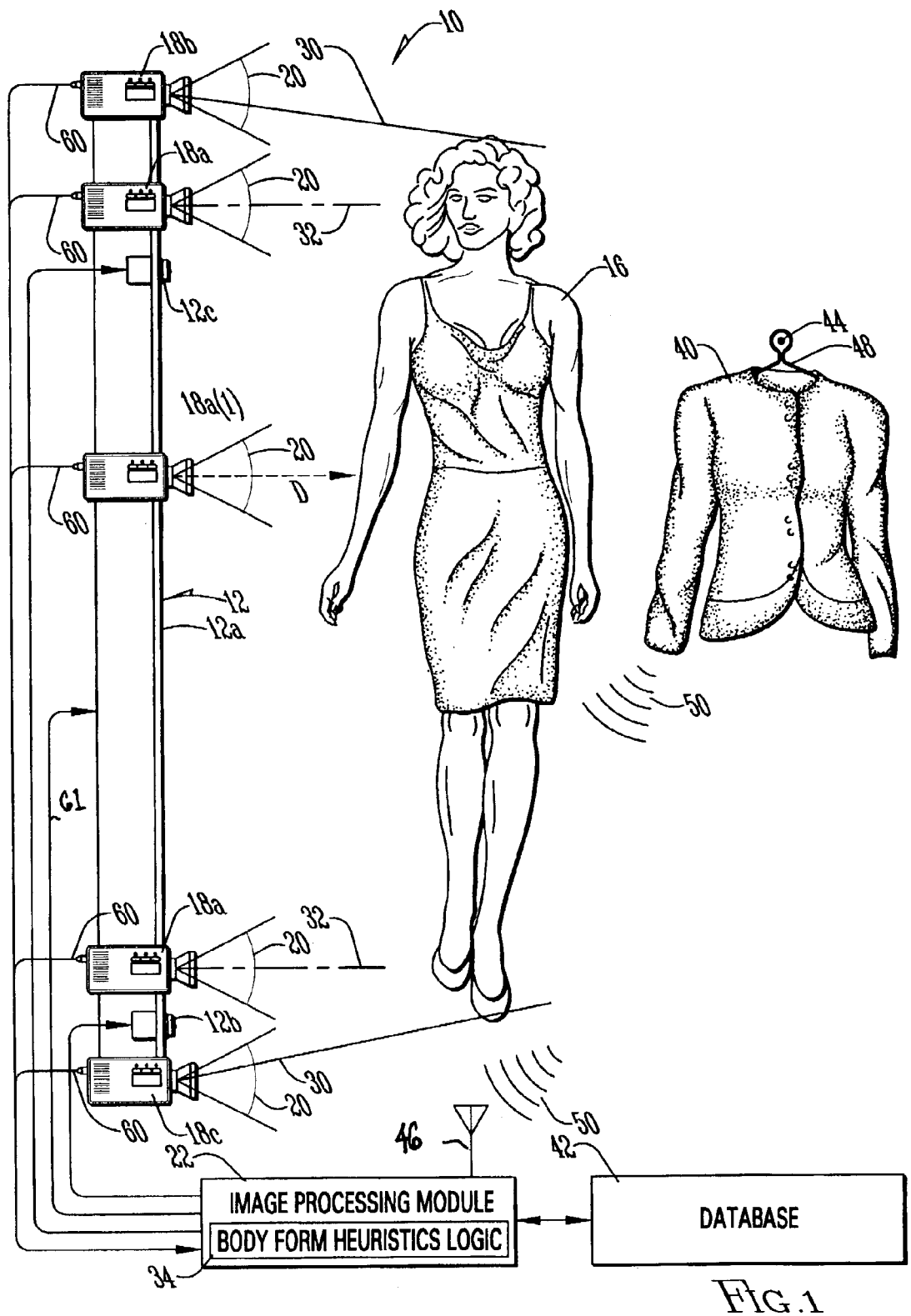
FIG. 1 shows a side-view of one system in use within a store.
Figure 1A:
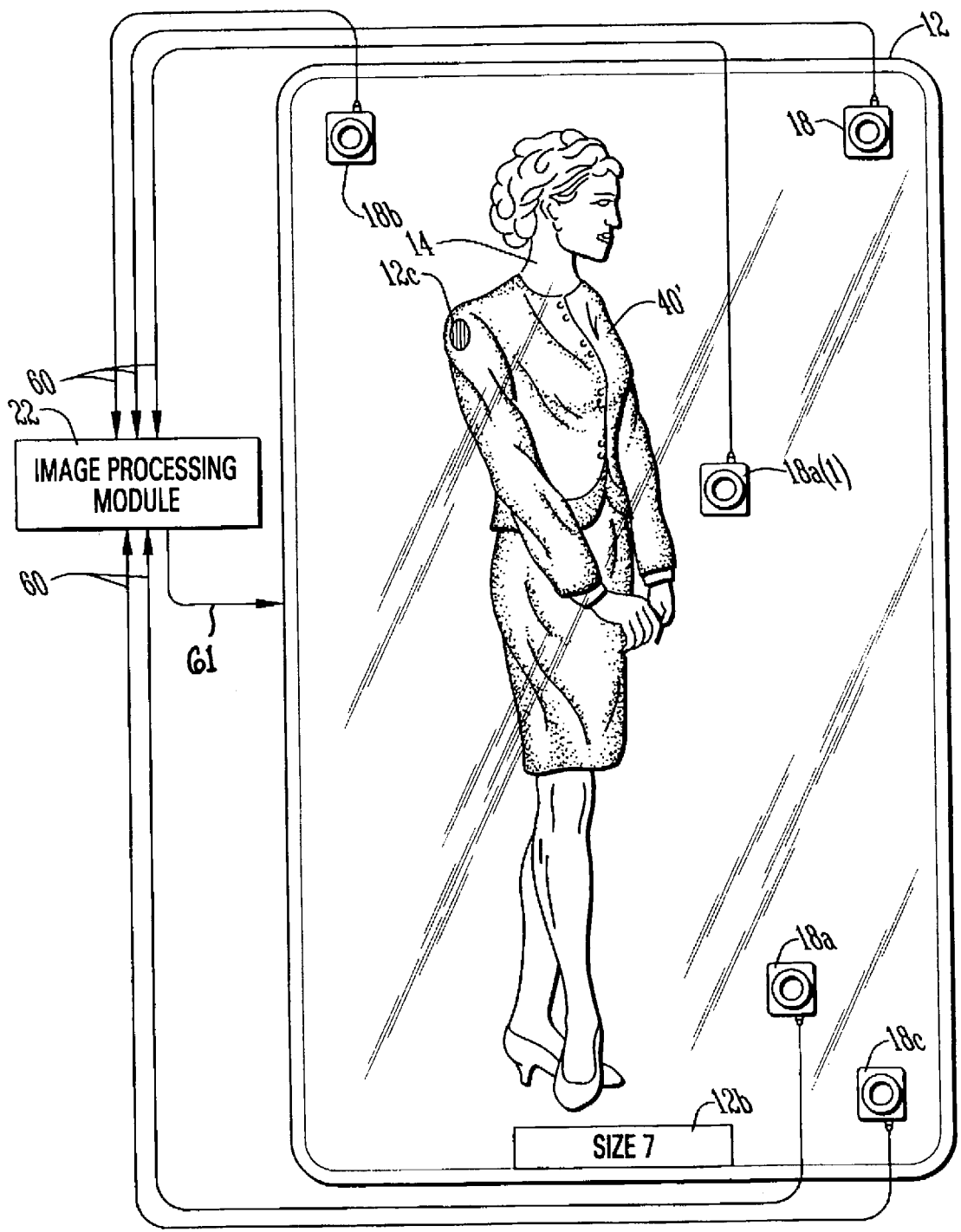
FIG. 1A shows a front view of the display of FIG. 1.

FIG. 1 and FIG. 1A show a system 10 for generating a virtual clothing experience. A display 12 provides an electronic image 14 of a person 16 standing in front of display 12. A plurality of cameras 18 capture images of the person 16; each of the cameras 18 has a field of view 20, as shown. Frames of images from cameras 18 are communicated to an image processing module 22 to synthesize the frames into image 14. As described below, image 14 may be substantially similar to the normal image expected by person 16 if person would view a reflection of her image from a mirror at the location of display 12. That is, system 10 may substantially reproduce the normal "reflective" image 14 of person 16, including normal skin and facial features; however, system 10 may also synthesize an image 40' of an article of clothing 40 within image 14 so that it appears as if the person is wearing article 40 normally, but without physically putting clothing 40 on person 16. Cameras 18 are preferably color digital cameras; and display 12 preferably displays color synthesized images from module 22 in forming image 14.

Preferably, cameras 18 are arranged with geometrical coordinates such that combination of frames from multiple cameras 18 provides an estimation of the size of person 16. By way of example, camera 18b and 18c define edges 30 (represented by one or more pixels of cameras 18b, 18c) of person 16; one camera 18a may also include auto-focus capability to define a distance D between display 12 and person 16. In combination, module 22 estimates the size of person 16 by the trigonometry associated with edges 30 and distance D. Other techniques may be used to estimate the person's size without departing from the scope hereof. By way of example, center image lines 32 may also define a height and width of person 16. System 10 may be made with a single camera 28, preferably a center camera 18a(1) to obtain a frontal view of person 16; however multiple cameras 18 enhance the image processing and realism of image 14.

Module 22 also preferably includes body form heuristics logic 34 that assists in estimating the size of person 16. Logic 34 may for example modify an estimation of a person's size, defined for example by geometries 30, 32, to account for body forms such as thin, fat, large waist, short upper torso, etc. Logic 34 may also include neural network logic to "learn" to help system 10 better identify body shapes and sizes.

In one embodiment, module 22 estimates the clothing size (e.g., small, medium, large, extra large, size 6, 7, etc.) of person 16 based on the size estimations described above and according to manufacturing or industry conventions for clothing sizing. In one embodiment, database 42 stores images of clothing such as clothing 40. When appropriate, system 10 synthesizes the images within database 42 into image 14, together with a synthetic image based upon frames of data from cameras 18, to display article 40' on image 14 as if person 16 had actually tried on clothing 40. An image 40' within database 42 may be directly scaled and overlaid on the image of person 16 to define image 14, or images within database 42 may be synthesized to provide a more natural-looking image 14.

System 10 either determines which size of clothing 40' to place onto image 14, or person 16 selects the clothing size. Person 16 may select a size by pressing a button 44 to identify article 40; button 44 may be anywhere within the store as a matter of design choice, such as with the hanger 48 holding clothing 40 on a rack of the store. Further, button 44 preferably couples with an RF transmitter to communicate the size to an antenna 46 of module 22 as RF signals 50. System 10 may inform the user of the size (selected manually by person 16 or automatically) in a display segment 12b of display 12. Segment 12b may alternatively be a separate display such as an LED display.

In one embodiment, database 42 stores images therein of articles of clothing, such as clothing 40, and as worn by a user of various body sizes. That is, images within database 42 may be "real" digital pictures of articles of clothing on various persons with different body sizes, and in different positions. In operation, therefore, system 10 may determine the body size of person 16 and then more easily overlay an image of article 40 with an appropriate image from database 42. For example, if system 10 determines that person 16 is a size 7, it may acquire an image of article 40 in the database and on a previously acquired image of a person with a size 7 body, and in a position similar to person 16 in front of display 12. Module 22 then synthesizes the images of person 16, captured by cameras 18, with the image of clothing 40 on a similarly sized person (and preferably in a similar position as person 16). Image processing module 22 may execute one or more cross-correlations of images within database 42 with images from cameras 18 to determine which position and body size provide the best "match" (similar to match filtering, known in the art).

In the even that system 10 determines that a clothing size does not "fit" the body form of person 16, it may indicate a problem by a display segment 12c. Segment 12c may alternatively be a LED or other indicator. Segment 12c may show "red" illuminating the problem to person 16; segment 12c may be part of the display of article 40, as shown in FIG. 1A, illustrating where the article does not fit person 16 at that body location.

System 10 may use image recognition techniques to automatically match clothing 40 to images within database 42. Alternatively, person 16 may select the article such as by pressing button 44, so that system 10 expressly knows which clothing images to synthesize within image 14.

Cameras 18 may be integrated with display 12 as shown, to provide a modular system, or they may be separate from display 12, as a matter of design choice. In one embodiment, at least one camera 18a views "through" display 12. Alternatively, one or more cameras 18b, 18c may be adjacent to display 12, as shown. A camera such as camera 18a(1) may also view person 16 through a hole within display 12, without departing from the scope hereof; such a hole has little overall impact on image 14 viewed by person 16. Cameras 18 typically connect with module 22 by signal lines 60, which may include power, video and/or network cabling.

Display 12 is for example a LCD display, flat panel display, or plasma display, that show images at its display face 12a and under control of module 22. Module 22 may transmit display information to display 12 via signal line 61, for example.

As an alternative to database 42, system 10 may capture an image of article 40 in "real time" and synthesize that image with the image of person 16 as image 14. That is, cameras 18 capture images of article 40, particularly when person 16 holds up article 40 in front of him; system 10 of one embodiment uses this information to generate image 14 (with image 40' of article 40).

Figure 2:
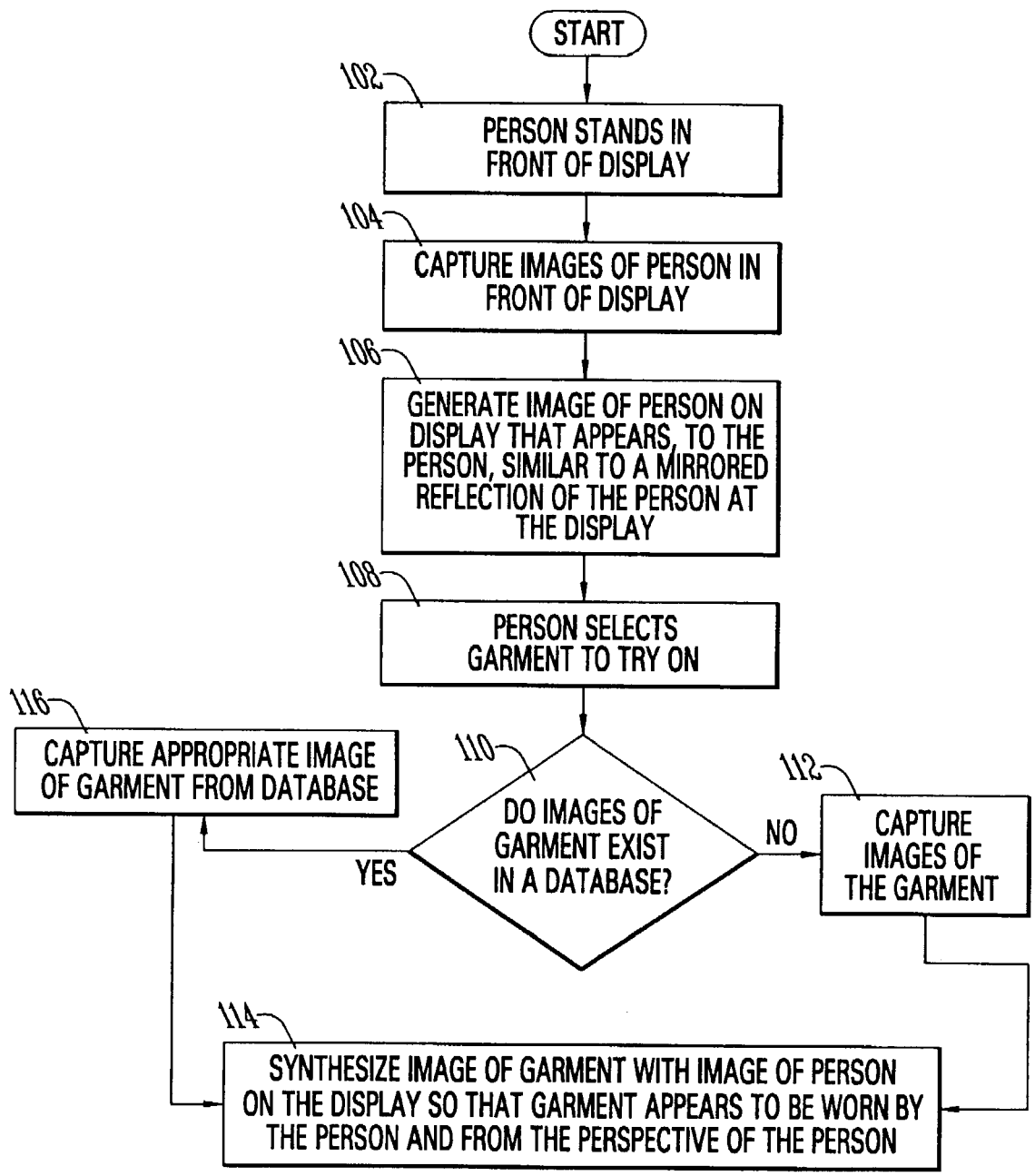
FIG. 2 shows a flowchart illustrating one process of a system such as shown in FIG. 1 and FIG. 1A.

FIG. 2 shows a flowchart 100 illustrating one operation with software steps for one system 10. After start, person 16 stands in front of the display 12, in step 102. At step 104, digital image frames of person 16 are captured by cameras 18 with display 12. At step 106, those frames are synthesized to form an image 14 on display 12 that is similar to how person 16 would appear, from the perspective of person 16, in a mirrored reflection from a mirror positioned at display 12. In step 108, person 16 selects a garment 40 to try on. If images of the garment 40 are not available in database 42, decided at step 110, then images of garment 40 are acquired, in step 112. Those acquired images are integrated (as image 40') with image 14 of person 16, in step 114, so that it appears, to person, 16 that garment 40 is being worn when viewing display 12. If images of garment 40 are available, in database 42, decided at step 110, then database images of garment 40 are located, at step 116, and then integrated and/or synthesized (as image 40') with image 14 of person 16, as in step 114.

Figure 3:
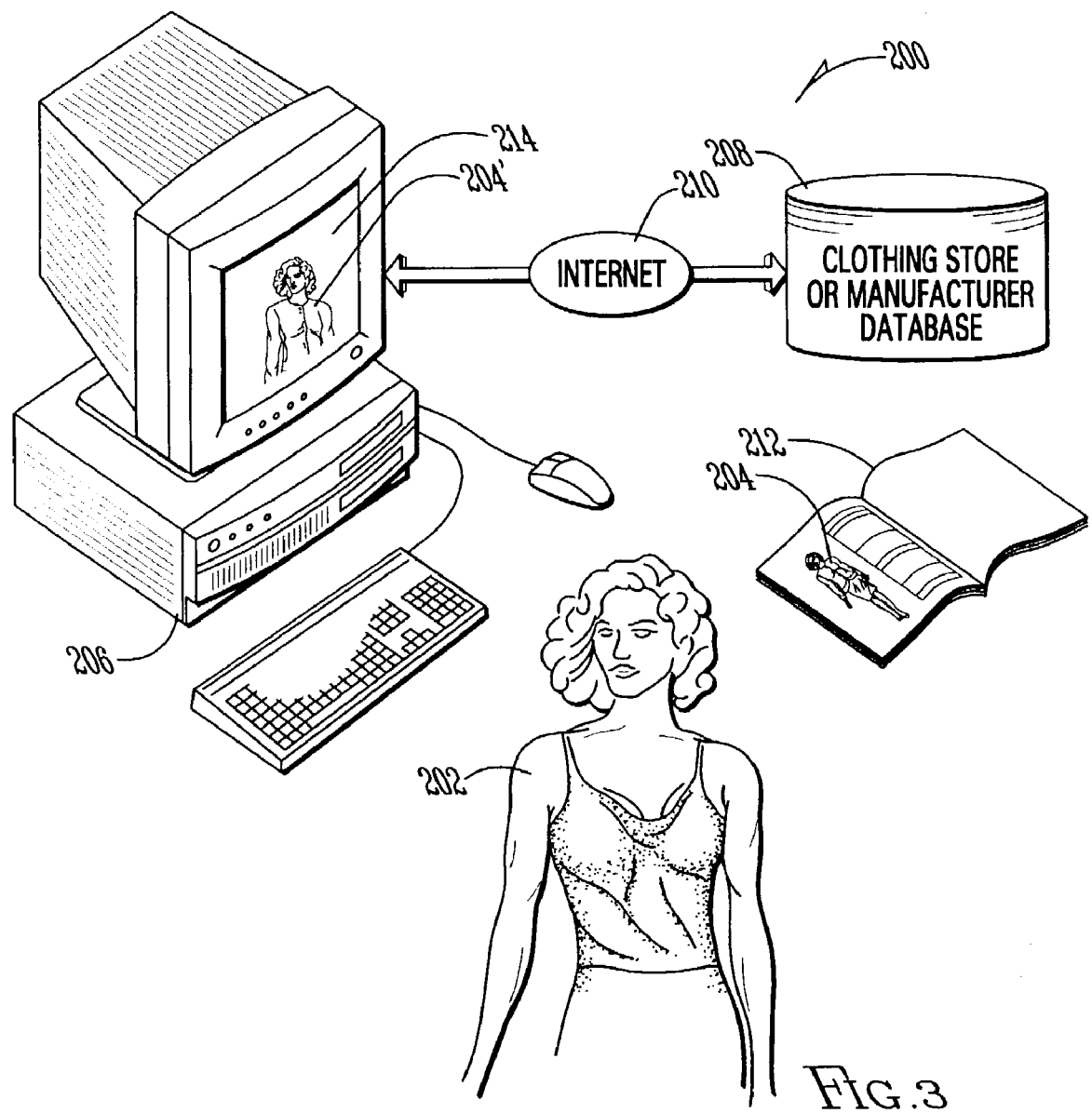
FIG. 3 shows a one system in use within a person's home.

FIG. 3 shows one system 200 for generating a virtual clothing experience. A person 202 uses system 200 to try on an article of clothing 204 (clothing 204 is an image, not actual clothing) at a home computer 206. Though not required, computer 206 may connect with a database 208 through the Internet 210. Database 208 may be controlled by a clothing store or manufacturer; and thus system 200 may be used to purchase clothing from the store or manufacturer. System 200 may also be used to try on articles of clothing 204 such as found in a direct mail catalog 212, where images of clothing 204 are made available and a person selects a clothing identifier to "try on" the selected garment by viewing images of himself at computer 206.

Computer 206 is specially programmed according to the teachings herein. Preferably, a body form matrix is stored within computer 206. By way of example, a body form matrix may take the form of an avatar, known in the art. The body form matrix provides sufficient information about person 202 at computer 206 so as to appropriately size that person for clothing. By way of example, the body matrix may define the person as a size 6, slender. Preferably, skin and facial feature images of the person are also stored within computer 206, so that computer 206 synthesizes the body matrix with the skin and facial features to generate an image 214 that appears substantially "real" to person 202 at computer 206. Image 214 includes the image of clothing 204'—which may be identical to image 204 in catalogue 212; however, preferably image 204' is synthesized within computer 206 so that image 214 is in the position (e.g., standing, sitting, back view, front view) desired by person 202. Such synthesis seeks to make image 214 as "real" as possible so that person 202 has good feel for how clothing 204 would appear on person 202. Computer 206 may be programmed to show multiple views of image 214, such as showing person 202 in different positions, to "model" clothing 204 within computer 206.

In one embodiment, computer 206 and database 208 cooperate to provide image 214. In particular, the image segment 204' may derive from database 208; database 214 may in fact store the body matrix in cooperation with person 202 such as by a confidential account to buy clothes from the store or manufacturer.

Image 214 may include information showing person 202 that clothing 204 does not properly fit, such as by illuminating one or more pixels of the computer screen of computer 206 with "red" indicating a problem (e.g., similar to segment 12c, FIG. 1A). Indeed, a manufacturer or store supporting database 208 may use the avatar or 3D body matrix to predetermine how a particular garment 204 will fit a person of similar size. Specifically, each image of catalog 212 or database 208 may include "fit" information linked to a particular body matrix. For example, if a body matrix of size large 10 attempts to wear a garment 204 of slender 8, system 200 would indicate that a sizing problem exists, such as through colored pixels warning of the misfit. System 200 may "suggest" the correct size, preferably in cooperation with the manufacturer or store of database 208.

Since certain changes may be made in the above methods and systems without departing from the scope hereof, it is intended that all matter contained in the above description or shown in the accompanying drawing be interpreted as illustrative and not in a limiting sense. It is also to be understood that the following claims are to cover all generic and specific features described herein, and all statements of the scope of the invention which, as a matter of language, might be said to fall there between.

What is claimed is:

1. A method for generating a virtual clothing experience, comprising the steps of:
   capturing, with one or more digital cameras, frames of first images of a person in front of a display; and
   synthesizing, with an image processing module connected to the display and digital cameras by one or more signal lines, the frames of first images with a garment image to generate a real-time electronic image on the display that appears, to the person, like a reflection of the person from a mirror positioned at the display and wearing the garment.

2. A method of claim 1, further comprising the step of capturing, with the digital cameras, frames of second images of a garment adjacent to the person, to generate the garment image.

3. A method of claim 2, further comprising synthesizing, with the image processing module, frames of the second images to generate the real-time electronic image on the display with the first images and the garment image.

4. A method of claim 1, further comprising the steps of imaging, with the digital cameras, a garment adjacent to the person and electronically searching a database for the garment image.

5. A method of claim 4, further comprising executing image correlation algorithms on the first images to facilitate searching of the database for an appropriate image.

6. A method of claim 4, further comprising synthesizing the appropriate image to generate the garment image.

7. A method of claim 1, further comprising sizing the person through geometries associated with orientation of the digital cameras capturing the first images.

8. A method of claim 7, wherein capturing frames of the first images comprises using the digital cameras in a fixed orientation to the display.

9. A method of claim 1, further comprising indicating an improper clothing fit within the electronic image shown at the display.

10. A method of claim 9, the step of indicating comprising displaying colors within the electronic image and co-located with a section of the electronic image associated with the improper clothing fit.

11. A method of claim 1, further comprising generating a signal representative of clothing size.

12. A method of claim 11, the person electronically selecting the clothing size.

13. A method of claim 11, further comprising automatically determining a clothing size based on images of a garment adjacent to the person.

14. A method of claim 1, further comprising generating a signal identifying a garment associated with the garment image.

15. A method of claim 14, the person electronically selecting the garment.

16. A method of claim 14, further comprising automatically determining the garment based on images of a garment adjacent to the person.

17. A system for generating a virtual clothing experience:
   an electronic display for mounting with a wall;
   one or more digital cameras for capturing frames of first images of the person standing in front of the electronic display; and an image processing module for synthesizing the frames of first images and for generating a real time electronic image on the electronic display that substantially appears, to the person, like a reflection of the person in a mirror positioned at the electronic display.

18. A system of claim 17, the digital cameras capturing frames of second images of a garment with the person, the image processing module synthesizing the frames of second images with the frames of first images to generate the real time electronic image that substantially appears, to the person, that the reflection wears the garment.

19. A system of claim 17, further comprising a database connected to the image processing module and for storing one or more images of clothing, the image processing module synthesizing one or more of the images of clothing with the first images to generate the real time electronic image that substantially appears, to the person, that the reflection wears the garment.

20. A system for virtually displaying clothing to a person, comprising:

a computer having a display and garment image driver software, the computer storing an avatar of the person within internal memory; and a database for storing images of clothing therein the computer displaying an image of the person, based on the avatar, on the display and wearing one or more of the images of clothing when the clothing is selected by the person at the computer.

21. A system of claim 20, the computer storing a body matrix of the person within internal memory, the body matrix defining a size of the person.

22. A system of claim 21, the body matrix defining a volumetric size of the person.

23. A system of claim 21, the body matrix comprising the avatar.

24. A system of claim 20, the database being connected to the computer through the Internet.

25. A system of claim 24, the database being in control of one of a clothing store or clothing manufacturer, wherein the person may purchase and buy clothing from the store or manufacturer via an Internet transaction.

26. A system of claim 20, the computer comprising the database.

27. A system of claim 20, the images of clothing corresponding to a clothing catalogue, wherein the person defines which of the images of clothing to display with the image.

28. A system of claim 20, the computer displaying colors associated with an improper fit of clothing when selected by the person and based on a size of the person.

29. A system of claim 20, the image of the person comprising the avatar.

\* \* \* \* \*